(12) United States Patent
Tam

(10) Patent No.: US 9,648,130 B1
(45) Date of Patent: May 9, 2017

(54) FINDING USERS IN A SOCIAL NETWORK BASED ON DOCUMENT CONTENT

(71) Applicant: Inform, Inc., Atlanta, GA (US)

(72) Inventor: Anthony L. Tam, Palo Alto, CA (US)

(73) Assignee: Inform, Inc., Atlanta, GA (US)

( * ) Notice: Subject to any disclaimer, the term of this patent is extended or adjusted under 35 U.S.C. 154(b) by 879 days.

(21) Appl. No.: 13/941,057

(22) Filed: Jul. 12, 2013

Related U.S. Application Data

(60) Provisional application No. 61/670,940, filed on Jul. 12, 2012.

(51) Int. Cl.
*G06F 17/30* (2006.01)
*H04L 29/08* (2006.01)

(52) U.S. Cl.
CPC ...... *H04L 67/306* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 5,659,766 | A | 8/1997 | Saund et al. |
| 7,567,958 | B1 * | 7/2009 | Alspector et al. ............ G06F 17/30867 |
| 2006/0064431 | A1 | 3/2006 | Kishore et al. |
| 2009/0216696 | A1 | 8/2009 | Downs et al. |
| 2010/0138427 | A1 | 6/2010 | Van De Par et al. |
| 2011/0125679 | A1 * | 5/2011 | Brdiczka ............. G06Q 10/10 706/12 |
| 2011/0125767 | A1 | 5/2011 | Moritz et al. |
| 2011/0191311 | A1 | 8/2011 | Polonsky et al. |

* cited by examiner

*Primary Examiner* — Hung Q Pham
(74) *Attorney, Agent, or Firm* — Jason A. Bernstein; Barnes & Thornburg LLP

(57) ABSTRACT

A method finds people within a network of people who are interested in the same topic. Individual user profiles, for people within the network of people based upon concepts featured in documents consumed by said people so that the individual user profiles include user-specific concepts, are provided in a database. A document concerning a topic of interest is selected. A computer system creates a model of the selected document including document-specific concepts featured in the selected document. A computer system compares the document-specific concepts to the user-specific concepts from the individual user profiles. Any matches as a result of the comparing step are determined. If there are any matches, at least one match is reported to a user.

4 Claims, 7 Drawing Sheets

FINDING USERS IN A SOCIAL NETWORK BASED ON DOCUMENT CONTENT

CROSS-REFERENCE TO OTHER APPLICATIONS

This application claims the benefit of U.S. provisional patent application No. 61/670,970, filed 12 Jul. 2012, entitled Finding Users in a Social Network Based on Document Content.

BACKGROUND OF THE INVENTION

There is often a need or at least a desire to find people within a network of people, such as a social network, who are interested in the same topic. However, while it is possible to find users based upon their pattern of document consumption, it is difficult to determine if users who were both interested in Document A and Document B are interested in the same topic without knowing about the content of the two documents and without knowing more about the users.

SUMMARY OF THE INVENTION

A method for finding people within a network of people who are interested in the same topic is carried out as follows. Individual user profiles, for people within the network of people based upon concepts featured in documents consumed by said people so that the individual user profiles include user-specific concepts, are provided in a database. A document concerning a topic of interest is selected. A computer system creates a model of the selected document including document-specific concepts featured in the selected document. A computer system compares the document-specific concepts to the user-specific concepts from the individual user profiles. Any matches as a result of the comparing step are determined. If there are any matches, at least one match is reported to a user.

Some methods can include one or more the following. Providing user profiles can include selecting a document consumed by a particular user, generating a feature vector, and accumulating the feature vector to a user profile for the particular user; the feature vector can include a normalized version of the term in the document, at least one attribute of usage for the normalized term, and a strength value for the normalized term relative to the document, the strength value indicating the likelihood that the normalized term indicates what the document is about. Selecting a document can be carried out by visiting a resource by the user, determining if a document from the resource has been consumed by a user thus indicating a desired level of user interest in the document, and if yes, selecting said document, and if no, awaiting a further user visit to a resource. In some examples documents determined to have been consumed by the particular user include documents produced or created by the particular user; such documents can also include documents which the particular user has accessed for more than a minimum length of time and less than a maximum length of time. The model creating step can include generating a feature vector for the document, the feature vector comprising document-specific concepts, the document-specific concepts each comprising a normalized version of a term in the document and at least one attribute of usage for the normalized term, the feature vector also comprising a strength value of the normalized term relative to the document, the strength value indicating the likelihood that the normalized term indicates what the document is about. The comparison of document-specific concepts to the user-specific concepts can include creating a plurality of feature levels of the document-specific concepts for the selected document, creating a plurality of feature levels of the user-specific concepts for the individual user profiles, and comparing the document-specific concepts to the user-specific concepts at a chosen corresponding feature level.

Other features, aspects and advantages of the present invention can be seen on review the drawings, the detailed description, and the claims which follow.

DETAILED DESCRIPTION OF THE INVENTION

Figure 1:
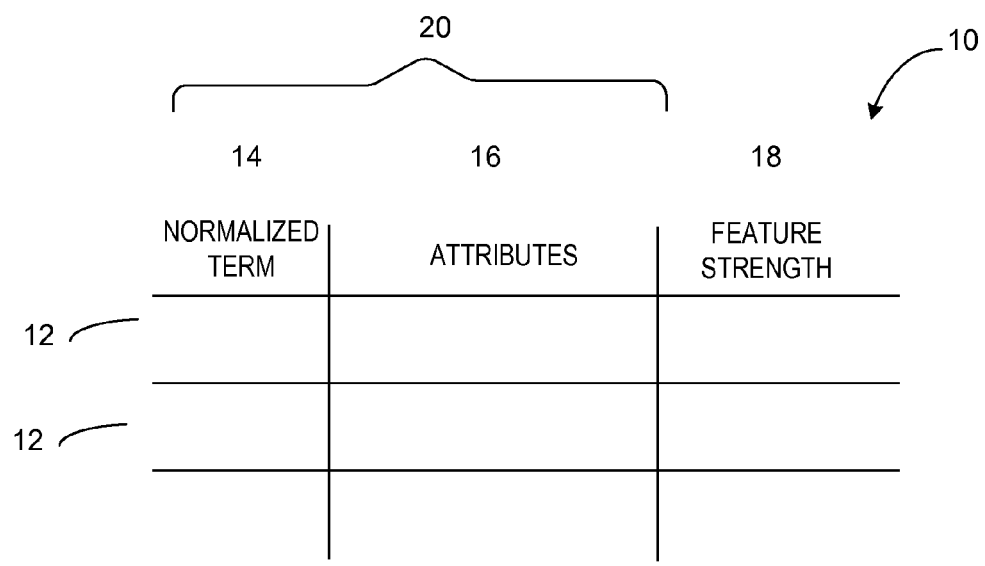
FIG. 1 is a chart illustrating components of a feature vector.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Generation of User Profiles

User profiles for users in a network are created and stored in a database. The user profiles are generated as the particular user consumes content. For purposes of this application, documents consumed by a user will include documents produced or created by the user. A document which was not created or produced by a user may still be considered to have been consumed by a user; this is discussed in some detail below. The content used to generate user profiles can be of any text type, including transcripts of audio or video. In various embodiments, the content can be in languages other than English. The users can be individual users or "publishers" (a group blog, a traditional publisher, a newsletter authored by more than one person). The recommended matching users can be saved to a matching users list or shared to a group. The technique can be used, for example, as part of any kind of browser or reader software, as a stand-alone "tell me who is interested in" application, or a plug-in to any content-management system for display to end users or recommendation system for followers.

The techniques described herein use a feature vector to summarize the concepts featured in each document consumed or created by the user. These feature vectors are accumulated as documents are consumed, to thereby form the user's profile. When a new document or resource is consumed by the user, the system combines the feature vector of the new resource currently with the user's past history as represented in his or her profile.

Figure 2:
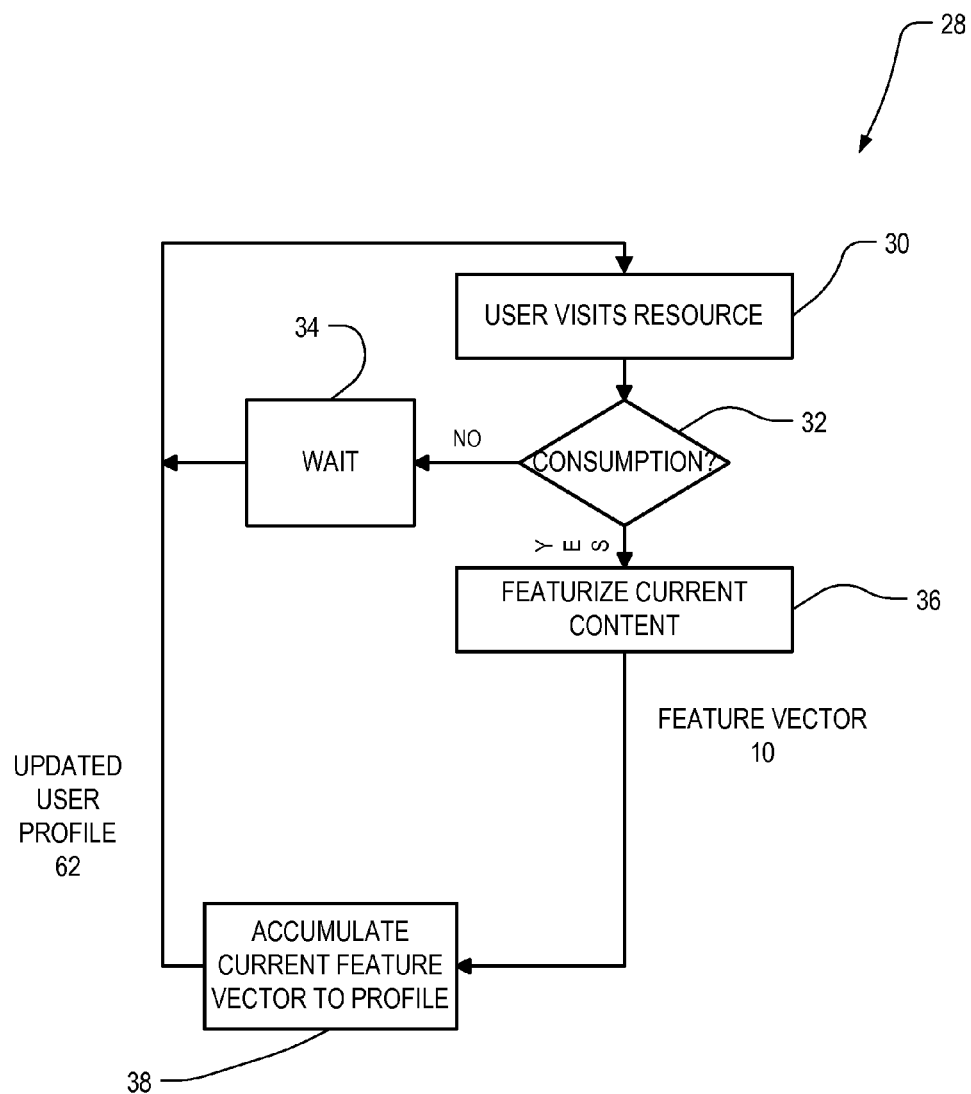
FIG. 2 is a flowchart illustrating one example of a method for generating user profiles.

The document summaries, such as those of FIG. 1, and the user profiles, such as those generated in FIG. 2, are preferably represented in a manner to be compatible to enable one or more (and preferably all) of the following functions:

- The compatibility of the representation permits the system to summarize each new document consumed by the user (also called the user's "current content"), and accumulate the summary into the user's profile.
- The compatibility of the representation permits the system to blend a summary of the user's current content with his or her profile, using a simple arithmetic function with weights that can be easily varied to optimize the resulting representation as a predictor of the user's current interest.
- The compatibility of the representation permits the system to compare it with summaries of other documents in order to select users whose profiles are most likely to match the topics in the document of interest.

In an embodiment, a document summary represents the concepts addressed in the document, together with a measure of the strength with which the document addresses them. Strength describes how likely the term is to be an indicator of what the document is about. For example, a document may discuss the financing of old houses in Palo Alto, Calif. Three concepts represented in the document summary, then, would be 'financing', 'old houses', and 'Palo Alto, Calif.'. The document may be mostly about 'financing', rather than 'old houses' (which, taken out of context, could suggest the document is about remodeling). However, it is desirable to include both the "financing" and "old houses" concepts in the summary since the intersection of the two concepts more accurately describes the document's subject matter than either one individually. Thus the document summary may include both concepts, but indicate a feature strength for 'financing' which is greater than the feature strength for 'old houses'. The concept 'Palo Alto, Calif.' may be of only minor relevance to the main subject matter of the document, but is nevertheless included in the document summary with a lower feature strength.

The strength measure (also referred to herein as the feature strength) can be calculated based on such metrics as the number of times that a relevant term is used in the document in a way that relates to the concept, and the quality of such usages. In an embodiment, feature strength can be a 'score' that indicates how likely the term is to be an indicator of what the document is about. Such a score can be as described in U.S. patent application Ser. No. 13/151,088, filed 1 Jun. 2011, incorporated by reference herein, and can be calculated using, for example, any of the techniques described therein. In a user profile, the feature strength has the same meaning, but determined over the universe of documents consumed by the user rather than over just one document. (The terms 'document' and 'resource' are used interchangeably herein to refer to whatever unit of content the system considers as a unit to be summarized. It could be a single web page, or a book or book chapter, or a particular person's blog or blog entries, and so on.)

FIG. 1 is an illustration of a feature vector 10 that can be used to store a document summary or a user's profile. Feature vector 10 can be considered a model of the document including document-specific concepts featured in the document. Feature vector 10 has a plurality of entries 12 (rows in FIG. 1), each entry indicating a normalized term 14, attributes 16 of its usage, and the strength 18, also called feature strength 18, with which it is likely to indicate what the document is about. The normalized term 14 is a single identifier which represents the term and all its synonyms. The attributes 16 indicate a way in which the term is used, and can include such attributes as part of speech (such as noun, verb, determiner, noun phrase, or more sophisticated parts of speech such as 'proper noun singular', 'verb gerund or present participle'), word type (such as person, place or organization), or usage mode (such as 'insult'). Together, the normalized term 14 and the attributes 16 indicate a concept 20, also referred to as a feature 20, addressed in the document.

FIG. 2 is a flowchart 28 illustrating how a user profile might be constructed. As mentioned above, documents produced or created by user will be considered to be consumed. In step 30, the user visits a resource. In step 32, the system 28 makes a determination of whether the current visit should or should not be considered "consumption" of the resource. This determination avoids adding documents to the user's profile which do not truly indicate the user's interests—such as if the user clicked on a link accidentally. There are many ways to define "consumption". In one embodiment, consumption can be identified by the user scrolling through the document, or the user remaining on the page for more than a minimum period of time (suggesting that the user is reading it) but less than a maximum period of time (which might suggest that the user has walked away or is doing something else). Preferably the consumption determination is a binary one. In another embodiment, however, consumption can be represented as a probability which is then later used to reduce the weight given to the document's feature summary as an indicator of the user's interests. If the current user visit to a resource is not considered consumption, then in step 34 the system 28 waits for a time and then returns to step 30.

If the current user visit is considered to be consumption, then in step 36 the system featurizes the current document content, thereby generating a feature vector 10 such as that shown in FIG. 1. In step 38, the feature vector calculated for the current document is accumulated into the user's profile, yielding an updated profile. The system then returns to step 30 to await the user's next visit to a resource. In an embodiment, the accumulation into the user's profile is accomplished by simply summing the strength value separately for each feature. For example, if the existing user profile contains entries 12 for features A-C, and the feature vector 10 for the current document contains entries 12 for features A, B and D, then accumulation is accomplished by:

- adding the strength 18 of feature A from the current feature vector 10 to the strength of feature A in the existing profile;
- adding the strength 18 of feature B from the current feature vector 10 to the strength of feature B in the existing profile;
- leaving the strength 18 of feature C unchanged in the existing profile;
- inserting new feature D into the user's profile with the strength 18 from the current feature vector 10.

Figure 3:
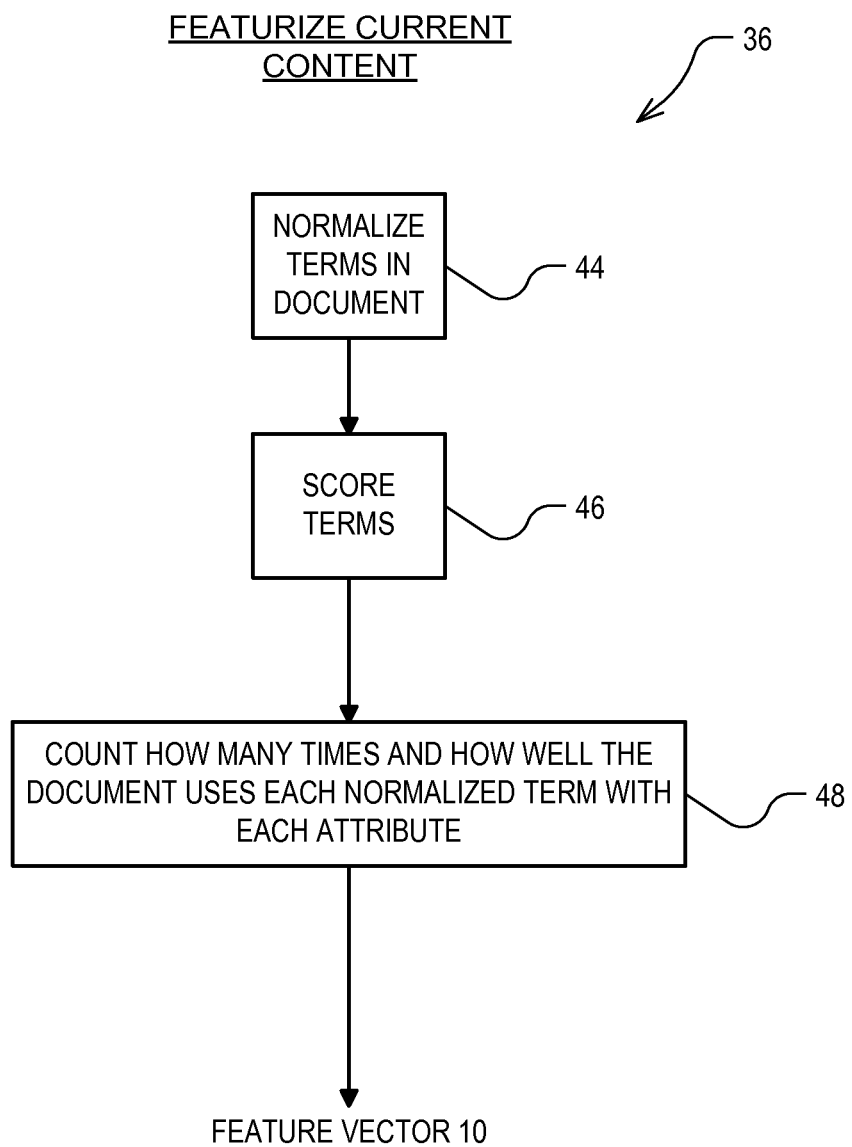
FIG. 3 is a flowchart illustrating one example of the current content featurizing step of FIG. 2.

FIG. 3 is a flowchart detail of step 36 of FIG. 2, for featurizing the current content. In step 44, the system normalizes the terms of the document by converting all synonyms of a particular word to a common identifier. In step 46 methods like those described in the above-incorporated patent application are used to score the terms to indicate how well each term is used either within a sentence, or within the entire document. This step also identifies the attributes 16 of each usage of the term in the document. Each combination of a normalized term 14 and set of attributes 16 then represents a concept 20, or feature 20. In step 48, the system counts how many times and how well the document uses each concepts 20, to thereby determine the feature strengths 18 for each of the concepts 20 used in the document.

Finding Other Users

Figure 4:
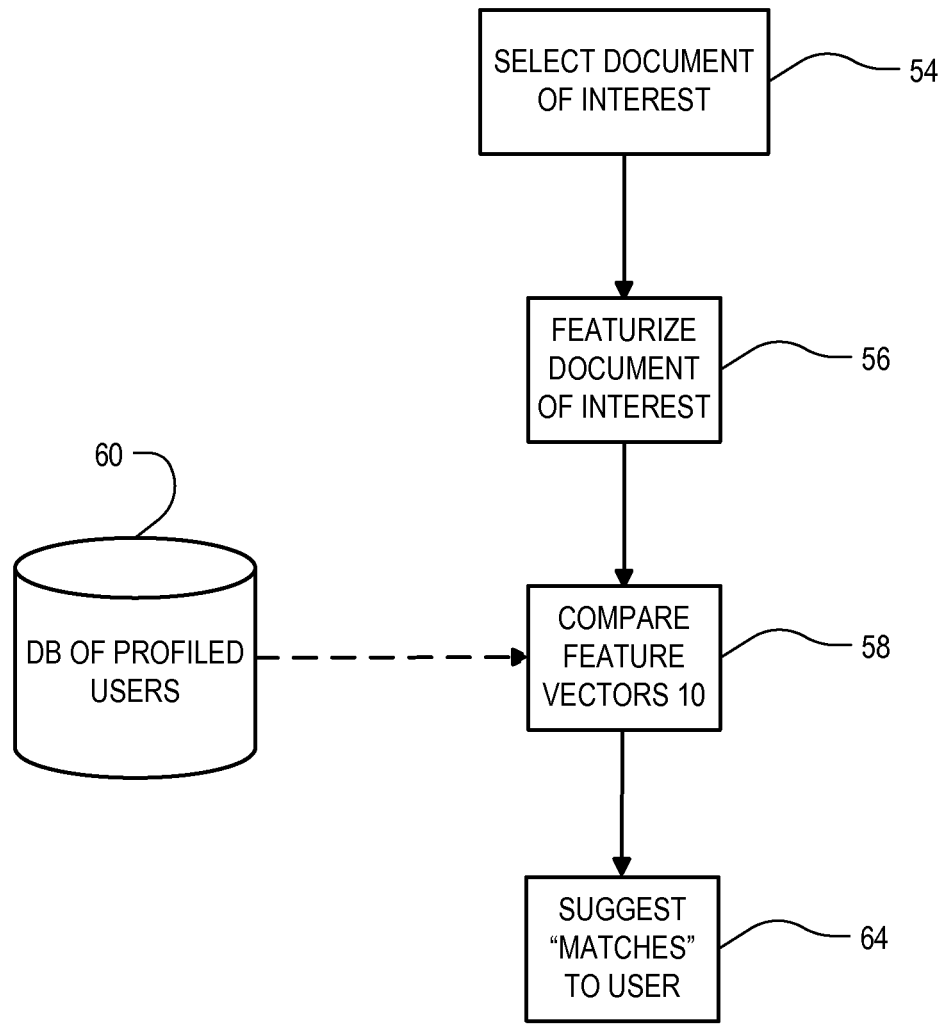
FIG. 4 is a flowchart indicating an example of finding users interested in the same topic.

Finding users who are interested in the same topic can be carried out as follows. As shown in FIG. 4, a document concerning a topic of interest is selected at 54. If not already featurized, the document of interest is featurized at step 56 in a manner similar to that discussed above at step 36 in FIG. 2. The document of interest can be selected by a user, for example. In other examples, the document of interest can be selected by a computer system, either in response to user activity or based on another algorithm.

In step 58, the system compares the feature vector 10 of the document of interest with the user profiles in a database 60 of profiled users of a network of users. As used herein, the term "database" does not necessarily imply any unity of structure. For example, two or more separate databases, when considered together, still constitute a "database" as that term is used herein. Step 58 typically yields a list of one or more user profiles, sometimes referred to as user profile documents, from the database 60, together with an indication of the probability with which they would be interested in the topic of interest. This list of user profiles is referred to herein as "matching" user profiles, and it will be appreciated that this does not mean that the document of interest and the user profile documents have to exhibit an identical interest in the topic of interest. In step 64, one or more of the user profile documents corresponding to individual users within the network of users are typically presented ranked in the order of their probabilities for being interested in the same topic.

Figure 5:
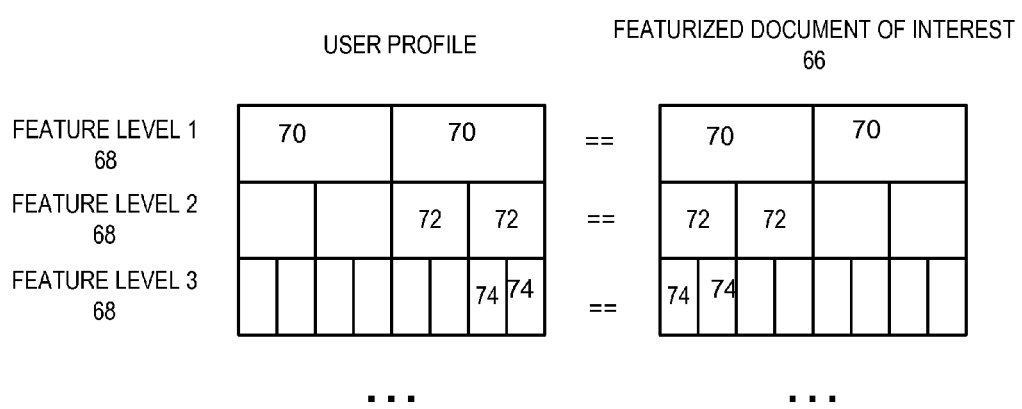
FIG. 5 illustrates one example of the use of feature vectors to find matching interest in the same topic.

FIG. 5 illustrates the use of feature vectors 10 for finding matching interest in the same topic. The concepts in the featurized document of interest (66 in FIG. 5) and in the user profile (in FIG. 5) are first ranked by strength 18 (third column in FIG. 1) and then organized into feature levels 68. Feature level 1 contains, for example, the two strongest concepts 20, 70 in the featurized document interest 66 or in the user profile. Feature level 2 contains, for example, the next four strongest concepts 20, 72 in the featurized document interest 66 or in the user profile, and feature level 3 contains, for example, the next eight strongest concepts 20, 74 in the featurized document interest 66 or in the user profile, and so on. The use of power-of-two size increases in each level is only one implementation. In another embodiment, the size increases can be different, or two or more of the levels can have equal size or even become smaller with increasing level number.

In order to find matches, first the level 1 concepts/features 20 of the featurized documents of interest 66 are compared to the level 1 concepts/features 20 of the user profile, and all those having the same concepts/features 20 are selected for the list. If the list is too long for whatever the system's purpose is, then the system compares the level 2 concepts/features 20 of the featurized document the six to the level 2 concepts/features 20 of the user profile in the list of level 1 matches. The list is pruned of all user profiles whose level 2 concepts/features 20 do not match. If the list is still too long, then the level 3 concepts/features 20 are compared, and so on, until the list of user profiles has been pruned to a desirable size. The amount of pruning will depend upon how strong or how weak the interest must be in the same topic to be included in the list of users interested in the same topic.

Many variations are possible. As one example, a user within the network of users can be enabled to adjust his or her profile by deleting documents that do not represent the user's current interests. The text model also can be improved by asking users to rank or rate documents for quality or interest, or by incorporating book reviews or ratings by the user or other users, or by ranking texts based on their popularity (number of re-tweets, links, or re-blogs).

As another example, the universe of documents used in the user profiles can be windowed, such as by including only the most recent 1000 pages consumed, or only those consumed within the last 30 days.

The determination of who makes up the network of people for inclusion in database 60 can be carried out in different ways. For example, networks of people can be determined by means of cookies or other tracking information, or simply from a list of text documents (for instance, from URLs tweeted by a Twitter user, or saved to a bookmarking system, or book titles saved to a system such as Goodreads, or blog posts or tweets associated with a user). The system can crawl and analyze the text (using document clustering, classification, topic modeling, and other techniques) and build profile of a person in of the network based on text consumption and production.

Figure 7:
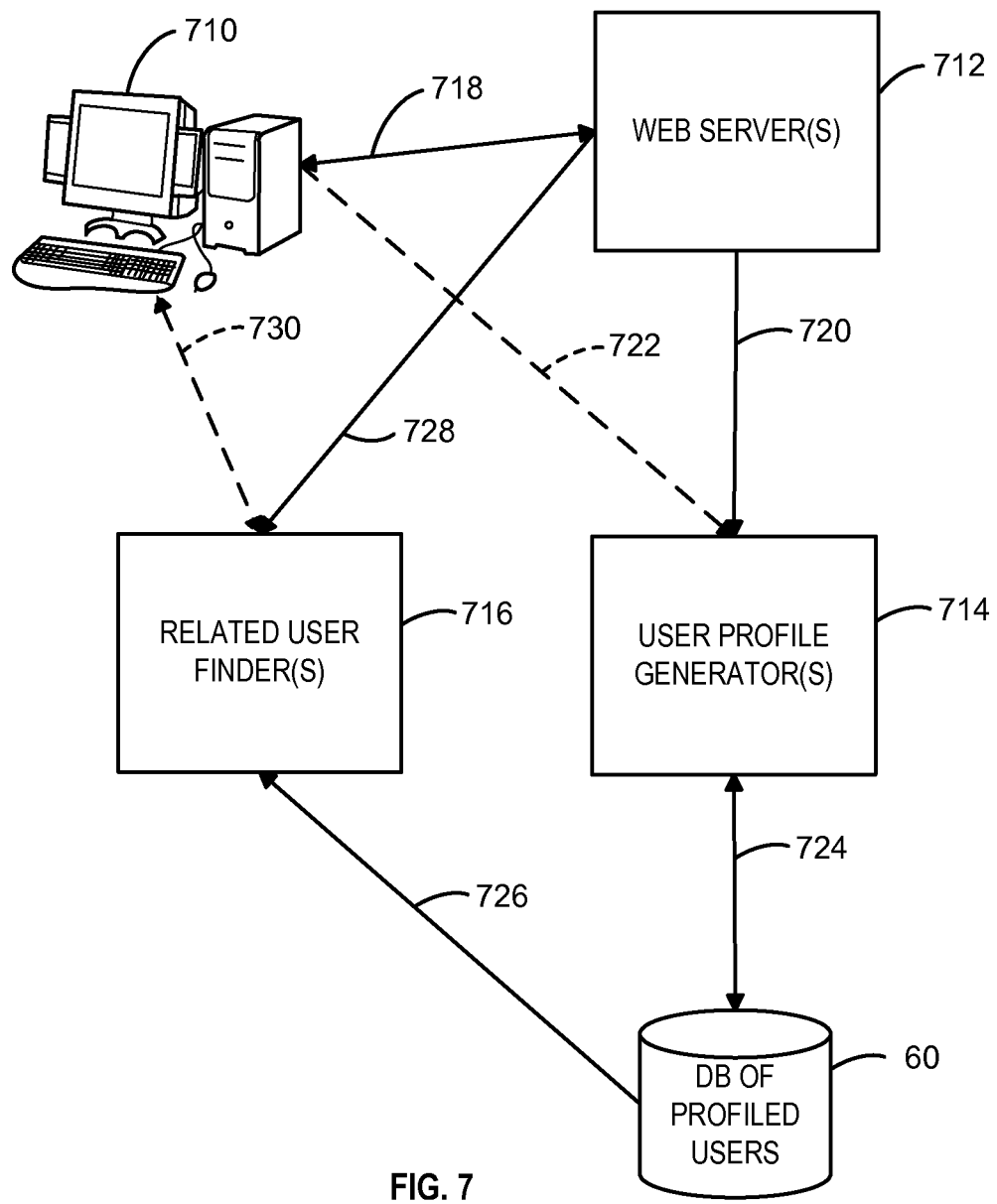
FIG. 7 is a block diagram of an example arrangement of components which can be used to implement aspects of the invention.

FIG. 7 is a block diagram of an example arrangement of components which can be used to implement aspects of the invention. It includes a user (depicted by the user's computer 710), one or more web servers 712, one or more user profile generators 714, and one or more related user finders 716, all in communication with each other over a network which may be, or include, the internet. The database 60 of profiled users is accessible to the user profile generators 714 and the related user finders 716 on links 724 and 726, respectively.

In operation, the user 710 uses a browser to surf the web. Web servers 712 transmit information to the user 710 for the various web pages visited, using communication link 718. Certain websites are programmed to support user profile generation in accordance with the principles described herein. When the user visits a page of such a website (step 30 in FIG. 2), the web server 712 either directly notifies a user profile generator 714 of the page being viewed by the user 710 (on link 720), or causes the user 710's computer to notify a user profile generator 714 of the page being viewed by the user 710 (on link 722). The user profile generator 714 thus receives an identification of the page visited by the user (for example in the form of a URL), in conjunction with an identification of the user 710. The web server 712 may determine the user's identification for example by requiring the user 710 to log in before viewing the selected page. In an embodiment, the web server 712 or the user 710's computer also notifies the user profile generator 714 when the user navigates away from the page, so that the user profile generator can judge whether to consider the visit as "consumption" of the page. When the user profile generator 714 determines that consumption has occurred (step 32 in FIG. 2), then it features the page's content (step 36) and accumulate the current feature vector into the user's profile (step 38) in the database 60.

In response to some trigger, for example when the user visits a website that is so programmed, a related user finder 716 is asked for any other users having interests matching those which are featured in the web page currently being viewed. This request may be transmitted by the web server 712 directly (on link 728), or it may be transmitted by the user 710's computer on link 730. If it is transmitted by the user 710, then the request may be triggered by commands that had been transmitted to the user's computer with the web page code, or it may be triggered by the user's computer itself, for example under the control of a browser plug-in. In any event, the request to the related user finder 716 includes an identification of the current web page (for example in the form of a URL), and constitutes a selection of a document of interest (step 54 in FIG. 4). The related user finder 716 featurizes the web page (step 56 in FIG. 4), compares the resulting feature vector to those in the database of profiled users (step 58 in FIG. 4), and returns resulting user matches (step 64) in FIG. 4) to the user 710's computer. The resulting matches may be transmitted directly to the user's computer on link 730, or may be transmitted to the web server 712 on link 728, which transmits them in turn to the user's computer on link 718. The resulting matches may be identified by any means, such as by a username or screen name within the user network, or by an icon or photo, or by a cryptic identifier, and may be accompanied by a hyperlink that the user 710 can open in order to find out more about the match.

Thus generally, the user profile generators 714 perform the steps of FIG. 2 whereas the related user finders 716 perform the steps of FIG. 4. However, many other divisions of responsibility are possible as well. For example, there may be several user profile generators 714 all having access to the database 60, for example in order to divide the workload. There may be several related user finders 716 all having access to the database 60, for example for the same reason. In another embodiment the related user finder(s) 716 and user profile generator(s) 714 may constitute only a single computer system. A web server 712 and/or the user's computer may also be combined into a common computer system with one or more of the other components in FIG. 7. Many other variations will be apparent to the reader.

Hardware

Figure 6:
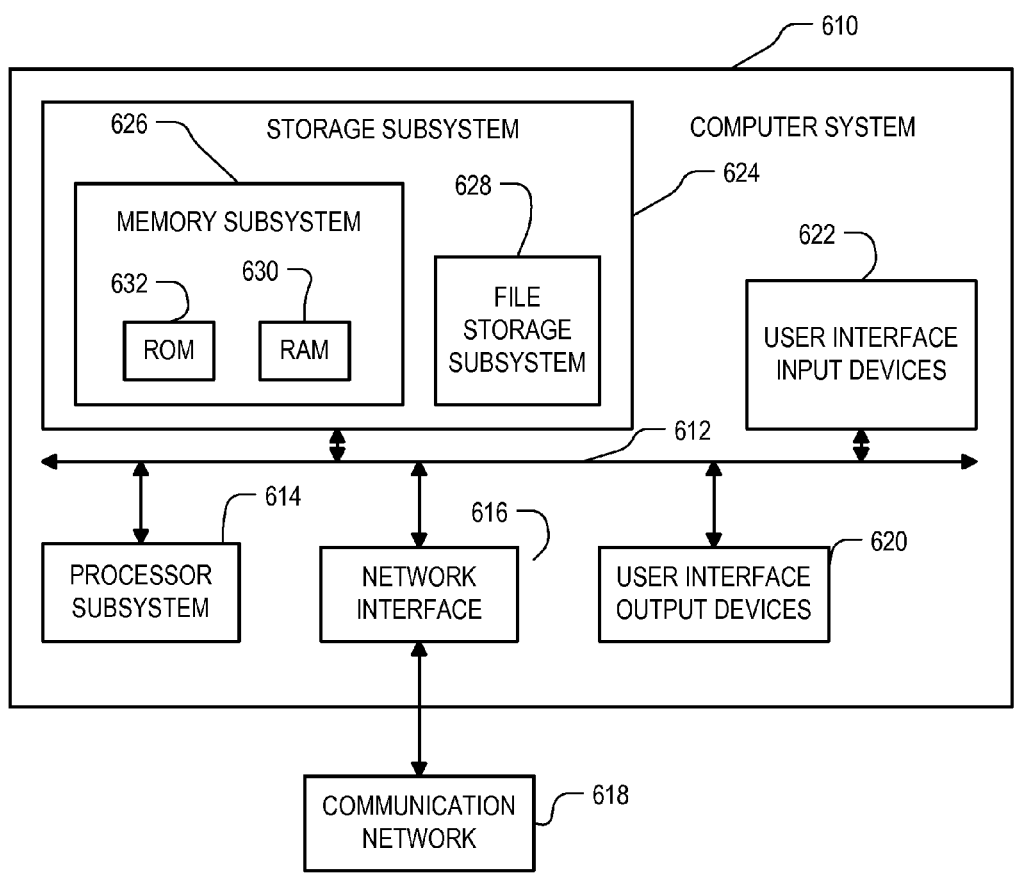
FIG. 6 is a simplified block diagram of a computer system that can be used to implement aspects of the present invention.

FIG. 6 is a simplified block diagram of a computer system 610 that can be used to implement the user 710's system, the web servers 712, the user profile generator(s) 714 and/or the related user finder(s) 716. While FIGS. 2-5 indicate individual acts as carrying out specified operations, it will be appreciated that each act actually causes a computer system such as 610 to operate in the specified manner. The acts may be encoded in software to be executed by one or more computer systems.

Computer system 610 typically includes a processor subsystem 614 which communicates with a number of peripheral devices via bus subsystem 612. These peripheral devices may include a storage subsystem 624, comprising a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks, including an interface to communication network 618, and is coupled via communication network 618 to corresponding interface devices in other computer systems. Communication network 618 may comprise many interconnected computer systems and communication links. These communication links may be wireline links, optical links, wireless links, or any other mechanisms for communication of information. While in one embodiment, communication network 618 is the Internet, in other embodiments, communication network 618 may be any suitable computer network. In FIG. 7, the links 718, 720, 722, 728, and 730, and optionally 724 and 726, are part of the communication network 618.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 622 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 610 or onto computer network 618.

User interface output devices 620 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 610 to the user or to another machine or computer system.

Storage subsystem 624 stores the basic programming and data constructs that provide the functionality of certain embodiments of the present invention. For example, the various modules implementing the functionality of certain embodiments of the invention may be stored in storage subsystem 624. These software modules are generally executed by processor subsystem 614. Storage subsystem 624 also preferably carries the database 60.

Memory subsystem 626 typically includes a number of memories including a main random access memory (RAM) 630 for storage of instructions and data during program execution and a read only memory (ROM) 632 in which fixed instructions are stored. File storage subsystem 628 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 628. The host memory 626 contains, among other things, computer instructions which, when executed by the processor subsystem 614, cause the computer system to operate or perform functions as described herein. As used herein, processes and software that are said to run in or on "the host" or "the computer", execute on the processor subsystem 614 in response to computer instructions and data in the host memory subsystem 626 including any other local or remote storage for such instructions and data.

Bus subsystem 612 provides a mechanism for letting the various components and subsystems of computer system 610 communicate with each other as intended. Although bus subsystem 612 is shown schematically as a single bus, alternative embodiments of the bus subsystem may use multiple busses.

Computer system 610 itself can be of varying types including a personal computer, a portable computer, a workstation, a computer terminal, a network computer, a television, a mainframe, a server farm, or any other data processing system or user device. Due to the ever changing nature of computers and networks, the description of computer system 610 depicted in FIG. 6 is intended only as a specific example for purposes of illustrating the preferred embodiments of the present invention. Many other configurations of computer system 610 are possible having more or less components than the computer system depicted in FIG. 6. In one embodiment, the acts of FIG. 2 and acts of FIG. 4 are performed using separate software entities executed on common computer system hardware. Alternatively, they can be executed on separate computer system hardware, or separate virtual machines running on common computer system hardware. In another embodiment, the acts of FIGS. 2 and 4 are implemented as a single software entity with interspersed operational steps, though even in that embodiment, the functions performed can still be thought of as being divided into the two or more modules, merely operating in a time-shared or resource-shared manner. In addition, the steps of FIGS. 2-5 can be provided of as separate software modules as well. Many other variations will be apparent.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Modifications and variations will be apparent to practitioners skilled in this art. In particular, and without limitation, any and all variations described or suggested in documents incorporated by reference are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

Parts of the system can be tightly integrated with a user's browser, such as with Javascript, or more loosely integrated by way of a browser plug-in. As content arrives into the browser, the system analyzes it and sends information to one or more local or remote servers to accumulate the user's profile and/or find additional matching content. The system can also be implemented as a mobile phone or tablet application. Numerous other implementation options will be apparent to the reader.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for developing a database as described herein, systems including logic and resources to carry out such a method and/or support such a database, systems that take advantage of computer-assisted methods for developing or using such a database, media impressed with logic to carry out such methods and/or impressed with such a database itself, or computer-accessible services that carry out computer-assisted method described herein. It is contemplated that modifications and combinations will readily occur to those skilled in the art, which modifications and combinations will be within the spirit of the invention and the scope of the following claims.

Any and all patents, patent applications and printed publications referred to above are incorporated by reference.

What is claimed is:

1. A method for finding people within a network of people who are interested in the same topic, comprising:
   providing in a database, individual user profiles for people within the network of people based upon concepts featured in documents consumed by said people so that the individual user profiles include user-specific concepts, the act of providing user profiles comprising:
      selecting a document consumed by a particular user;
      generating a feature vector for the selected document, the feature vector comprising a normalized version of the term in the document, at least one attribute of usage for the normalized term, and a strength value for the normalized term relative to the document, the strength value indicating the likelihood that the normalized term indicates what the document is about; and
      accumulating the feature vector to a user profile for the particular user;
   selecting a newly selected document concerning a topic of interest, the document selecting step comprising:
      visiting a resource by the user;

determining if a document from the resource has been consumed by a user thus indicating a desired level of user interest in the document;

if yes, selecting said document as the newly selected document; and if no, awaiting a further user visit to a resource;

a computer system creating a model of the newly selected document including document-specific concepts featured in the newly selected document, the model creating step comprising generating a new feature vector for the newly selected document, the new feature vector comprising document-specific concepts, the document-specific concepts each comprising a new normalized version of the term and at least one attribute of usage for the new normalized term, the new feature vector also comprising a strength value of the new normalized term relative to the newly selected document, the strength value indicating the likelihood that the new normalized term indicates what the newly selected document is about;

a computer system comparing the document-specific concepts to the user-specific concepts from the individual user profiles;

determining any matches of individual user profiles for people within the network of people as a result of the comparing step; and if there are any matches, reporting at least one individual user profile from the individual user profiles for people within the network of people to a user.

2. The method according to claim 1, wherein documents determined to have been consumed by the particular user include documents produced or created by the particular user.

3. The method according to claim 1, wherein documents determined to have been consumed by the particular user include documents which the particular user has accessed for more than a minimum length of time and less than a maximum length of time.

4. The method according to claim 1, wherein the concepts comparing step comprises:

creating a plurality of feature levels of the document-specific concepts for the selected document;

creating a plurality of feature levels of the user-specific concepts for the individual user profiles; and comparing the document-specific concepts to the user-specific concepts at a chosen corresponding feature level.

\* \* \* \* \*